Oct. 13, 1964     C. O. WEISENBACH     3,152,445
HYDROSTATIC TRANSMISSION

Filed April 12, 1963     2 Sheets-Sheet 1

INVENTOR
CHARLES O. WEISENBACH

Oct. 13, 1964 C. O. WEISENBACH 3,152,445
HYDROSTATIC TRANSMISSION
Filed April 12, 1963 2 Sheets-Sheet 2

INVENTOR.
CHARLES O. WEISENBACH,
BY Dodge and Sons
ATTORNEYS 3,152,445
HYDROSTATIC TRANSMISSION
Charles O. Weisenbach, Watertown, N.Y., assignor to
The New York Air Brake Company, a corporation of
New Jersey
Filed Apr. 12, 1963, Ser. No. 274,376
10 Claims. (Cl. 60—53)

This invention relates to hydrostatic transmissions, and particularly to hydrostatic transmissions in which the pump unit is driven by a variable speed prime mover and it is required that the apparatus driven by the motor unit be operated at a substantially constant speed.

This application is a continuation-in-part of my co-pending application Serial No. 195,578, filed May 17, 1962, now abandoned.

The object of the invention is to provide a hydrostatic transmission of the type having at least one variable displacement hydraulic unit and including improved mechanism for varying the displacement of that unit and for automatically limiting the speed of the motor unit. According to the invention, the displacement control element of the variable displacement unit is positioned by a manually operated servo control having a supply passage from which it derives the motive fluid for moving the displacement control element. Interposed in the supply passage is a speed control valve which interrupts the supply of fluid to the servo control after the motor reaches a predetermined speed and thereby renders the latter ineffective to increase motor speed.

The preferred embodiment of the invention is intended for use on a mobile concrete mixer in which the pump unit is driven by the vehicle propulsion engine and wherein it is required that the mixer drum be operated at a substantially constant relatively low speed (on the order of 2 to 4 r.p.m.) during transit, and at a substantially constant higher speed (on the order of 18 to 20 r.p.m.) during charging. It is also required that the drum be rotated in the reverse direction during unloading at a speed selected by the operator.

In this form of the invention, the pump is the variable displacement unit and it is of the overcenter type, i.e., its displacement control element is movable between maximum displacement positions on opposite sides of a zero displacement position in order to vary displacement and reverse the direction of flow through the unit. The pump and motor are connected in a closed transmission circuit and the rate of flow through this circuit is used as the measure of motor speed. The flow rate sensing device includes a metering orifice and the pressures upstream and downstream of this orifice are applied to a double-acting piston motor that operates the speed control valve. Since speed control action is required only when the transmission is operating in the forward direction, this embodiment includes mechanism for automatically removing the orifice from the transmission circuit, and causing the speed control to open the supply passage of the servo valve, when the direction of flow through the circuit is reversed. In the illustrated embodiment, the last mentioned mechanism is arranged to insert the metering orifice into and remove it from the low pressure side of the transmission circuit and also serves to control communication between this side of the circuit and a charge pump that maintains the circuit liquid-filled.

The preferred form of servo control includes a double-acting piston motor and a follow-up servo valve that has a null position in which each side of the double-acting motor is connected with both the supply passage and a reservoir. In addition to controlling the connection between the supply passage and the source of control pressure, the speed control valve also controls a connection between the supply passage and the reservoir. Since the displacement control element is biased to the zero displacement position, the speed control is enabled to regulate as well as limit the speed of the motor.

The preferred embodiment will now be described in detail with reference to the accompanying drawings in which.

Figure 1:
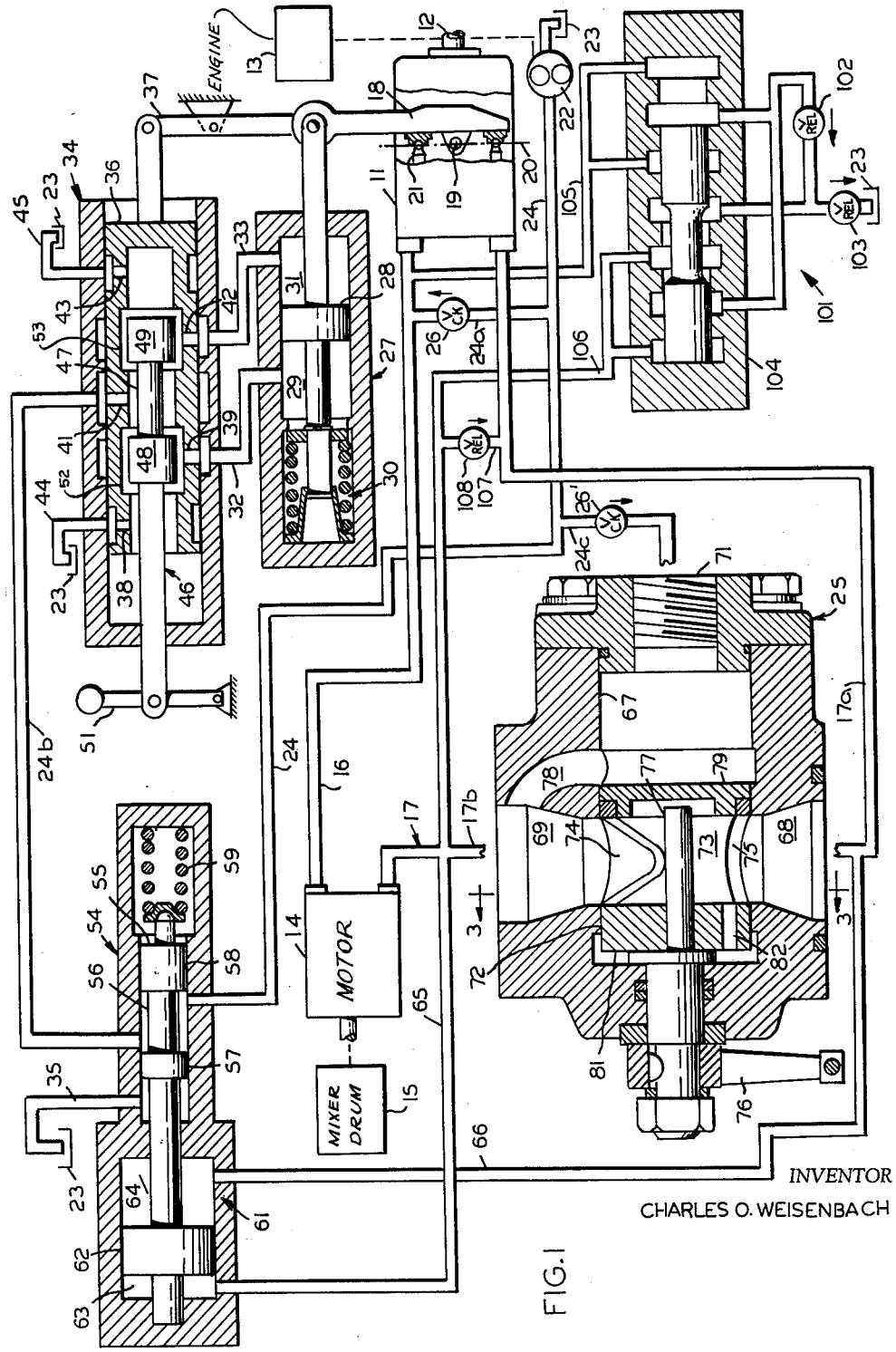
FIG. 1 is a schematic diagram showing the major elements of the transmission as used on a cement mixer, the orifice control device being shown in the position it assumes during forward operation.

Referring to FIG. 1, the transmission comprises a variable displacement pump 11 whose drive shaft 12 is connected with the propulsion engine 13 of the vehicle, a fixed displacement motor 14 which is connected through a speed reduction drive with the mixer drum 15, and a pair of main conduits 16 and 17 that connect the pump and motor in a closed transmission circuit. Both the pump 11 and the motor 14 are of the rotary cylinder barrel longitudinally reciprocating piston type, and the pump has a cam plate 18 that is movable about trunnion axis 19 between maximum displacement positions on opposite sides of the illustrated zero displacement position. Trunnion axis 19 intersects the axis of rotation of the cylinder barrel at a point in the plane 20 of the centers of the spherical heads of pistons 21 so that the forces exerted by the pistons urge the cam plate toward the zero displacement position when pump 11 is pumping. When pump 11 is driven as a motor, i.e., when drum 15 overruns motor 6 and causes it to act as a pump, these piston forces urge the cam plate 18 toward the maximum displacement position. It is believed that this reversal in the direction of action of the bias on cam plate 18 is attributable to a shift, in the direction of rotation, of the pressure distribution across the valve plate of the pump caused by rotation of the cylinder barrel. This shift has the effect of extending the high pressure kidney port in the valve plate and destroying its geometrical symmetry about a plane normal to the face of the valve plate and containing the trunnion axis. Since the low pressure kidney port during pumping is the high pressure port during motoring, the extension of the high pressure port is at one side of that normal plane during pumping and at the other side during motoring. As a result, the biasing moment exerted by the pump pistons subject to the pressure in the high pressure kidney port acts to move the cam plate in opposite directions depending upon whether the unit is pumping or motoring.

A charge pump 22, driven in unison with pump 11 and connected with reservoir 23, delivers fluid to main conduit 16 through conduits 24 and 24a and to main conduit 17 through conduits 24 and 24c and the orifice control device 25. Conduits 24a and 24c contain check valves 26 and 26' that prevent reverse flow from conduits 16 and 17, respectively, to conduit 24. The transmission includes a relief circuit 101 of the type disclosed in U.S. Patent 2,961,829, issued November 29, 1960, which includes high and low pressure relief valves 102 and 103, respectively, and a shuttle valve 104. The shuttle valve 104 is connected to the main conduit 16 through conduit 105, and to main conduit 17 at a point upstream of orifice control device 25 through conduit 106. This valve serves selectively to connect whichever of the main conduits is the higher pressure conduit with the high pressure relief valve 102 and to connect the remaining conduit with the low pressure relief valve 103. When the pressures in the two main conduits 16 and 17 are equal, valve 104 remains in its current position. As mentioned in Patent 2,961,829, the outlet of the high pressure relief valve is connected with the inlet of the low pressure relief valve. The outlet of low pressure relief valve 103 is connected with reservoir 23 through a flow path (not shown) leading through the casing of motor 14 and, if necessary, through a heat exchanger.

Cam plate 18 is positioned by a servo control including a double-acting motor 27 comprising a piston 28, opposed working chambers 29 and 31, and a centering spring assembly 30. Hydraulic oil is supplied to and exhausted from working chambers 29 and 31 through conduits 32 and 33, respectively, under the control of servo valve 34. This valve comprises a housing containing a reciprocable valve sleeve 36 which is connected with cam plate 18 through follow-up linkage 37 and which contains five longitudinally spaced radial passages 38, 39, 41, 42 and 43. Exhaust passages 38 and 43 are in continuous communication with reservoir 23 through conduits 44 and 45, respectively, motor passages 39 and 42 are in continuous communication with conduits 32 and 33, respectively, and supply passage 41 is in continuous communication with supply conduit 24b. Communication between the motor passages and the supply and exhaust passages is controlled by a valve plunger 46 formed with an annular groove 47 that defines two valve lands 48 and 49. A manual actuator 51 is provided for shifting plunger 46 within valve sleeve 36. In the illustrated neutral position, which also is a null position, lands 48 and 49 are positioned within annular chambers 52 and 53, respectively, so that motor passage 39 communicates with exhaust passage 38 and supply passage 41, and motor passage 42 communicates with supply passage 41 and exhaust passage 43. When plunger 46 is shifted to the right relatively to sleeve 36 the connections between passages 39 and 41 and between passages 42 and 43 are interrupted, and when plunger 46 is shifted to the left, the connections between passages 39 and 38 and between passages 42 and 41 are interrupted.

Supply conduit 24b is selectively connected with the charge pump 22 through conduit 24 and with reservoir 23 through conduit 35 by a speed control valve 54 including a reciprocable valve plunger 55. Valve plunger 55 is formed with an annular groove 56 and two lands 57 and 58 and is biased to the illustrated supply position in which groove 56 interconnects conduits 24 and 24b by a coil compression spring 59. Plunger 55 is moved to the right against the bias of spring 59 first to a lap position, in which land 57 blocks conduit 24b, and thence to a vent position in which conduits 24b and 35 are interconnected by a double-acting piston motor 61. Motor 61 includes a piston 62 and two opposed working chambers 63 and 64 which are connected with main conduit 17 at points located on opposite sides of the orifice control device 25 by conduits 65 and 66, respectively.

Figure 2:
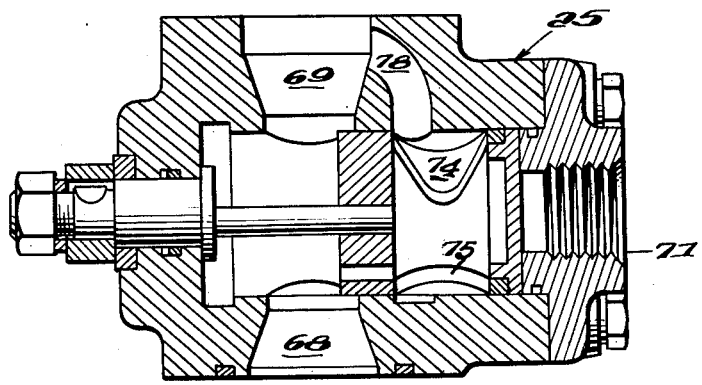
FIG. 2 is a sectional view of the orifice control device with the orifice carrier shown in the position it assumes during reverse operation.
Figure 3:
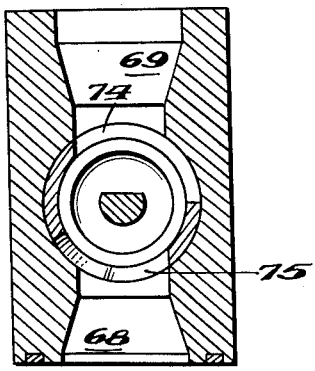
FIG. 3 is a sectional view taken on line 3—3 of FIG. 1.
Figure 5:
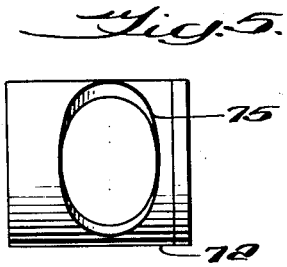
FIG. 5 is an elevation view of the orifice plug showing the port at one end of the transverse passage.
Figure 6:
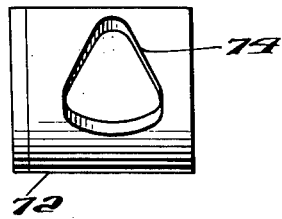
FIG. 6 is an elevation view of the orifice plug showing the elongated orifice port at the other end of the transverse passage.
Figure 4:
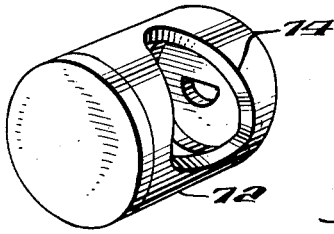
FIG. 4 is a perspective view of the orifice plug.

The orifice control device 25 is interposed in main conduit 17 and comprises a housing containing a bore 67 intersected by a pair of diametrically opposed passages 68 and 69 that are connected with main conduit portions 17a and 17b, respectively, and by a threaded axial passage 71 that is connected with charge pump conduit 24c. An orifice plug 72 is mounted for reciprocation and rotation in bore 67 and is formed with a transverse passage 73, which, in the position shown in FIG. 1, registers with passages 68 and 69. At one end, the passage 73 is provided with a port 74 whose width varies in the circumferential direction and this port constitutes a metering orifice. The opposite end of transverse passage 73 terminates in an elongated port 75 arranged to afford substantially free communication between passages 68 and 73 throughout the metering range of port 74. The restriction afforded by orifice port 74 depends upon the rotational position of plug 72 in bore 67 and this can be varied by a rotary actuator 76. The actuator is provided with a stem 77 of semi-circular shape in transverse cross-section that is received in a similarly formed axial bore in plug 72 and which transmits rotary motion to the plug without impairing its ability to slide freely in the bore 67. When plug 72 is in the longitudinal position shown in FIG. 1, passage 69, and therefore main conduit 17, communicates with charge pump conduit 24c through a branch passage 78, bore 67 and axial passage 71, but when plug 72 is moved to the position of FIG. 2, it blocks branch passage 78 and interrupts this communication. Since plug 72 automatically isolates charge pump 22 from conduit 17 when the transmission is operating in reverse and conduit 17 is the high pressure conduit, check valve 26' may appear superfluous. However, it is deemed advisable to include this valve in charge pump conduit 24c in order to insure that the charge pump will not be subjected to an excessive pressure during forward operation when branch passage 78 is open.

While the metering orifice could be located in either of the main conduits 16 and 17, the preferred location in conduit 17 affords certain definite advantages. In the first place, location of the orifice in the return path from motor 14 results in a more accurate measurement of motor speed because the pressure differential across it depends solely upon the rate of flow through the motor. If the orifice were located in conduit 16, the pressure differential would depend upon the total flow to the motor, and, since a part of this total flow is lost through leakage in the motor, the speed control always would indicate a speed higher than actual speed. Furthermore, since the amount of leakage in the motor varies with operating conditions, the difference between indicated speed and actual speed would not be constant. Second, the pressure pulsations created by pump 11 are dissipated as the fluid travels to and through motor 14 so that they do not adversely affect the performance of the speed control circuit. Third, since conduit 17 is at a low pressure most of the time, the parts of orifice control device 25 are subjected to high pressure only for relatively short intervals. Finally, by positioning the orifice in conduit 17, it is possible to use charge pump pressure to shift it into the transmission circuit during conversion from reverse operation to forward operation.

In the illustrated embodiment, it is assumed that main conduit 17 is the low pressure conduit when the transmission is operating in the forward direction, and therefore, the direction of flow through the orifice device will be from passage 69 to passage 68. Under this condition of operation, plug 72 is maintained in the position shown in FIG. 1 because the pressure acting on the right end face 79 and urging the plug to the left is the pressure upstream of the orifice port 74 and it is higher than the pressure downstream of the orifice port which is transmitted to the left end face 81 of the plug through longitudinal passage 82 and which urges the plug to the right. When the direction of flow through conduit 17 is reversed, the pressures acting on faces 81 and 79 become the upstream and downstream pressures, respectively, and plug 72 is shifted to the right to the FIG. 2 position. When the flow direction again reverses and conduit 17 becomes the low pressure conduit of the transmission circuit, charge pump pressure acting on end face 79 shifts plug 72 back to the FIG. 1 position where, as explained above, it is maintained by the pressure differential across the orifice port 74.

Assuming that the parts of the transmission are in the positions shown in FIG. 1 when the transmission is put into operation, a portion of the fluid discharged by charge pump 22 is delivered to servo valve 34 through conduit 24, plunger groove 56 and conduit 24b. This fluid passes through the valve to reservoir 23 along two parallel paths; one path comprising passage 41, plunger groove 47, annular chamber 52, passage 38 and conduit 44, and the other path comprising passage 41, plunger groove 47, annular chamber 53, passage 43 and conduit 45. The plunger lands 48 and 49 restrict these parallel flows slightly, but the resulting back pressure, which is transmitted to the working chambers 29 and 31 of motor 27, is not great enough to cause motor 27 to shift cam plate 18 away from the neutral position against the combined bias of the reaction forces of pump pistons 21 and the centering spring assembly 30.

In order to drive mixer drum 15 in the forward direction, the operator moves actuator 51 in the counterclockwise direction about its pivot so that valve plunger 46 moves to the left relatively to sleeve 36. This movement of the valve plunger causes land 48 to interrupt communication between passages 38 and 39 and causes land 49 to interrupt communication between passages 41 and 42, with the result that working chamber 29 is pressurized and working chamber 31 is vented. Motor 27 now moves cam plate 18 in the clockwise direction about its pivot 19 thereby causing pump 11 to deliver fluid under pressure to main conduit 16. This fluid flows through motor 14 and is returned to pump 11 through conduit portion 17b, orifice control device 25 and conduit portion 17a and causes the motor 14 to rotate mixer drum 15 in the forward direction. The rate of flow through the transmission circuit is a function of the angular position of cam plate 18 and, therefore, as the cam plate moves away from the illustrated zero displacement position motor speed increases. Because of the presence of follow-up linkage 37, movement of cam plate 18 shifts valve sleeve 36 to a null position with respect to plunger 36 and interrupts operation of motor 26 when the position of the cam plate corresponds to the position of actuator 51. Since the working chambers 29 and 31 of motor 27 communicate with both the supply conduit 24b and reservoir 23 when plunger 46 and valve sleeve 36 are in a null position, motor 27 is not hydraulically locked and the reaction forces exerted on cam plate 18 by pump pistons 21 and the biasing force exerted by centering spring assembly 30 tend to return cam plate 18 to the zero displacement position. However, since movement of cam plate 18 toward this position is accompanied by rightward movement of valve sleeve 36 relatively to valve plunger 46, working chamber 29 is pressurized as soon as the cam plate leaves the position established by actuator 51 and the cam plate is returned to that position. It is thus seen that the servo control provided for cam plate 18 is basically a position responsive control.

The pressures in main conduit 17 upstream and downstream of orifice port 74 are transmitted to the working chambers 63 and 64, respectively, of motor 61 through conduits 65 and 66 where they develop a net pressure force on piston 62 that shifts valve plunger 55 to the right against the bias of spring 59. When the rate of flow through the transmission circuit, and consequently the speed of motor 14, reaches a predetermined maximum value established by the setting of orifice port 74, land 57 of the speed control valve is moved to a lap position in which it interrupts communication between conduits 24 and 24b. If it happens that the position of cam plate 18 (and consequently the displacement of pump 11) selected by the operator produces, at the prevailing speed of engine 13, the predetermined maximum speed of motor 14, land 57 interrupts flow to conduit 24b as follow-up linkage 37 shifts valve sleeve 36 to a null position with respect to valve plunger 46. Since, at this time, working chamber 29 is vented to reservoir 23 through conduit 32, passages 39 and 38, and conduit 44, the biasing forces exerted on cam plate 18 by pump pistons 21 and centering spring assembly 30 move the cam plate in the displacement-decreasing direction and shift valve sleeve 36 slightly to the right from the null position. The resulting decrease in the rate of flow through the transmission circuit is accompanied by a reduction in the pressure force developed by motor 61 so that spring 59 now shifts plunger 55 to the left and causes groove 56 to again interconnect conduits 24 and 24b. Now working chamber 29 is again pressurized and motor 27 returns cam plate 18 to the selected position. The controls continue to cycle in this manner with the result that the speed of motor 14 is maintained substantially constant at the predetermined maximum value.

While it is possible for the operator to move cam plate 18 to the position that causes motor 14 to operate at the predetermined maximum speed, usually the selected position of the cam plate will cause the motor to operate at a higher speed. Thus, in the normal case, land 57 of the speed control valve will interrupt communication between conduits 24 and 24b before cam plate 18 reaches the selected position, and, consequently, before valve sleeve 36 is moved to a null position by follow-up linkage 37. Under these conditions, fluid can neither enter nor leave working chamber 29 once motor 14 reaches its predetermined maximum speed and, as a result, motor 27 becomes hydraulically locked and maintains cam plate 18 in the displacement position that produces that motor speed.

If the speed of engine 13 should increase while the transmission is in operation, the rate of flow through the transmission circuit, and the speed of motor 14, also will increase. However, this change in flow rate is accompanied by an increase in the pressure drop across orifice port 74 and in the pressure force developed by motor 61. Motor 61 now moves plunger 55 to the right from the lap position and causes it to connect conduit 24b with reservoir 23 through conduit 35. If the sleeve 36 of servo valve 34 is in a null position when speed control valve 54 vents conduit 24b, the cycling action mentioned above cannot occur and cam plate 18 is allowed to move to a reduced displacement position under the action of the biasing forces exerted by pump pistons 21 and by centering spring assembly 30. As the rate of flow through the transmission circuit is restored to the original value, spring 59 moves plunger 55 back to the lap position to close the vent path between conduit 24b and reservoir 23. Since sleeve 36 will now be in a position to the right of the null position, motor 27 is hydraulically locked and holds cam plate 18 in the new, reduced displacement position.

If, on the other hand, sleeve 36 is not in a null position when the speed of engine 13 increases, venting of conduit 24b by speed control valve 54 destroys the existing hydraulic lock at motor 27 and allows the biasing forces acting on cam plate 18 to move it in the displacement-decreasing direction. As in the previous case, plunger 55 is moved back to the lap position to hydraulically lock motor 27 when the rate of flow in the circuit is restored to the original value.

If the speed of engine 13 decreases while the transmission is in operation, the resulting decrease in pressure drop across orifice 74 causes motor 61 to shift valve plunger 55 to a position in which plunger groove 56 interconnects conduits 24 and 24b. If sleeve 36 is in a null position when this change in speed occurs, this means that the displacement of pump 11 previously selected by the operator is not great enough to maintain the speed of motor 14 under the new condition of operation, and the controls simply function to maintain cam plate 18 in the selected position. On the other hand, if sleeve 36 is not in a null position at this time, working chamber 29 is again pressurized and motor 27 moves cam plate 18 in the displacement-increasing direction. When the change in displacement of pump 11 exactly offsets the change in rate of flow through the transmission circuit produced by the decrease in the speed of engine 13, motor 61 returns valve plunger 55 to the lap position and motor 27 is again hydraulically locked.

Since the operation of speed control valve 54 depends upon the pressure drop across orifice port 74, it will be apparent that the predetermined maximum speed at which the speed control valve interrupts the supply of fluid to the servo valve 34 can be varied by rotating actuator 76 to either increase or decrease the restriction afforded by orifice port 74. During the drum charging operation, the actuator 76 is in a position that establishes a relatively low restriction at port 74 so that the drum 15 may be rotated at a relatively high speed (on the order of 18 to 20 r.p.m.). On the other hand, during transit, actuator 76 is in a position in which port 74 is highly restricted so that the maximum speed of drum 15 is limited to about 2 to 4 r.p.m.

In order to operate the drum 15 in the reverse direction, actuator 51 is moved in the clockwise direction about its pivot to thereby shift valve plunger 46 to the right from the illustrated neutral position. In this new position of plunger 46, working chamber 29 is vented to reservoir 23 through conduit 32, passages 39 and 38 and conduit 44, and working chamber 31 receives fluid under pressure from conduit 24b through passages 41 and 42 and conduit 33. Motor 27 now moves cam plate 18 in the counterclockwise direction about its pivot axis 19 to increase the displacement of pump 11 in the reverse direction and cause it to discharge to main conduit 17. Because of this change in the direction of flow through the transmission circuit, the pressure in passage 68 of the orifice control device 25 becomes higher than the pressure in passage 69, since this passage is now upstream of the orifice port 74. The downstream and upstream pressures are transmitted to the opposite ends 79 and 81 of the orifice plug 72 through branch passage 78 and longitudinal bore 82. As a result, a net pressure force is developed on plug 72 that shifts it to the right to the position shown in FIG. 2 in which the orifice port 74 is removed from the main conduit 17. The pressures which are transmitted to the working chambers 63 and 64 of motor 61 are now substantially equal (since the flow through the orifice device 25 is now substantially unrestricted) and spring 59 maintains valve plunger 55 in the illustrated position in which conduit 24b is connected with conduit 24. The operator now has complete freedom in selecting the speed of motor 14, and because of the presence of the follow-up linkage 37 each position of actuator 51 produces a corresponding position of cam plate 18, and, assuming that the speed of engine 13 remains constant, a corresponding speed of motor 14 and drum 15.

It will be observed that when valve plunger 46 is shifted to the right to effect reverse operation of the transmission, follow-up linkage 37 will tend to move valve sleeve 36 to the right to a null position with respect to plunger 46. As the plunger 46 and sleeve 36 approach the null position, the pressures in working chambers 29 and 31 tend to equalize and the forces exerted on cam plate 18 by the pump pistons 21 and by centering spring assembly 30 tend to return the cam plate 18 to the zero displacement position. However, since movement of the cam plate 18 toward this position will, through the follow-up linkage 37, produce leftward movement of sleeve 36 relatively to plunger 46 and thus cause motor 27 to move the cam plate 18 in the opposite direction, it should be apparent that, for all practical purposes, the cam plate 18 is maintained in a position corresponding to the position of actuator 51.

When the transmission is operating in the forward direction, the circuit is maintained liquid-filled by charge pump 22 which delivers fluid to the low pressure conduit 17 through conduits 24 and 24c, check valve 25', axial passage 71, bore 67 and branch passage 78. When the direction of flow through the transmission circuit is reversed and orifice plug 71 moves to the position shown in FIG. 2, this flow of fluid is interrupted and conduit 17, which is now the high pressure conduit, is isolated from the charge pump 22. During this reverse operation, charge pump 22 maintains the transmission circuit liquid-filled by delivering fluid to the conduit 16 (which is now the low pressure conduit) through conduits 24 nad 24a and check valve 26. When the transmission is again operated in the forward direction, the pressure in conduit 17 (which acts on end face 81 of the orifice plug 72) decreases below the pressure developed in conduit 24 by charge pump 22. As a result, charge pump pressure acting on end face 79 develops a force which shifts the orifice plug back to its FIG. 1 position. In this way, orifice port 74 is again inserted into conduit 17, and branch passage 78 is opened to thereby permit fluid to flow into the low pressure conduit 17 from charge pump 22.

It has been found that when a loaded drum 15 is rotating in the forward direction and the operator attempts to stop it by closing orifice 74, pump 11 cavitates and the transmission becomes quite noisy. These conditions can be explained as follows. As the orifice 74 begins to close, the pressure differential between working chamber 63 and 64 increases and motor 61 moves valve plunger 55 to its vent position. Cam plate 18, under the action of the biasing forces acting on it, now commences to move toward zero displacement position at the same rate as the orifice 74 is moving to closed position. Motor 14, on the other hand, decelerates at a lower rate because of the overrunning action of the load imposed by drum 15. As soon as the cam plate 18 begins to move, the pressure in main conduit 16 decreases and the transmission ceases to perform work. Initially, the pressure in conduit 17 remains at the low level set by low pressure relief valve 103 with which it is connected by shuttle valve 104. Although the rate of discharge from the motor 14 is now greater than the displacement of pump 11, the pump is not driven as a motor because the excess fluid is directed to reservoir 23 through low pressure relief valve 103. The difference between the flow demand of motor 14 and the output of pump 11 becomes greater as cam plate 18 moves toward zero displacement position, but for a time this deficiency is made up by the charge pump 22 which delivers an increasing quantity of fluid to conduit 16 through conduits 24 and 24a and check valve 26. Therefore, the pressure in conduit 16 remains equal to or slightly higher than the pressure in conduit 17 and shuttle valve 104 does not shift from its illustrated position.

When the demand of motor 14 exceeds the combined outputs of pump 11 and charge pump 22, cavitation occurs in conduit 16 and shuttle valve 104 shifts to the position in which main conduits 16 and 17 are connected with the low and high pressure relief valves 103 and 102, respectively. The pressure in conduit 17 now rises, but since the orifice 74 is still partially open, it does not reach the cracking pressure of high pressure relief valve 102. This rising pressure in conduit 17 brakes motor 14 and reduces its speed to a value at which the rate of discharge from the motor begins to approach the current regulated flow setting of orifice 74. When the speed of the motor 14 decreases to a value at which motor flow demand is less than the combined outputs of pumps 11 and 22, pump 11 again commences to pump, i.e., to do work. This action raises the pressure in conduit 16 and causes shuttle valve 104 to shift back to the illustrated position in which conduit 16 is connected with the high pressure relief valve 102 and conduit 17 is connected with the low pressure relief valve 103. As soon as this shift takes place, the pressure in conduit 17 decreases to the setting of low pressure relief valve 103 and the rate of deceleration of motor 14 decreases. The overrun condition is now recreated and continues until the demand of motor again exceeds the combined outputs of pumps 11 and 22. At that time, the shuttle valve 104 again shifts, thus raising the pressure in conduit 17 and increasing the rate of deceleration of motor 14. These cycles of overrun and braking continue until orifice 74 is fully closed. During this deceleration period, the cam plate 18 of the pump 11 lags movement of the orifice 74, so that it will not be in the zero displacement position when the orifice 74 reaches closed position. Therefore, when, on the next cycle following complete closure of the orifice, cavitation occurs in conduit 16 and the shuttle valve 104 shifts to the right, the inlet of pump 11 will be starved of oil. This is attributable to the fact that the relief path provided by high pressure relief valve 102 leads back to the inlet of motor 14 and thus by-passes the pump 11. Therefore, while the high pressure in conduit portion 17b increases substantially the rate of deceleration of motor 14, pump 11 cavitates during the interval of time required for the cam plate 18 to reach the zero displacement position. In time, this cavitation can cause serious damage to the pump. Furthermore, the cycling action that characterizes deceleration of motor 14 under overrun conditions causes severe shocks and noise.

In order to eliminate the conditions just described, the preferred transmission includes an orifice by-pass path defined by conduits 106 and 107 connected with main conduit portions 17b and 17a. Flow through this by-pass path is controlled by a relief valve 108 which is located in conduit 107 and is set to open at a pressure differential which is lower than the cracking pressure of low pressure relief valve 103 but which is high enough to create the pressure differential across orifice 74 sufficient to shift valve 54 when the orifice is in its minimum flow restricting position.

The inclusion of the orifice by-pass path and the relief valve 108 has the effect of eliminating the cycling action discussed above and of precluding cavitation at the pump inlet. Thus, when the operator moves orifice 74 in the closing direction in order to stop motor 14, cam plate 18 commences to move toward the zero displacement position at a proportional rate. As in the previous case, the pressure in conduit 16 now decreases, the pump 11 ceases to do work and motor 14 starts to decelerate. The cam plate 18 moves toward zero displacement position at a rate proportional to movement of the orifice until the combined outputs of pump 11 and charge pump 22 equal the flow demand of motor 14. At this point, the motor 14 tends to drive the pump 11 as a motor and, since the cam plate 18 is floating, i.e., valve 54 is in vent position, the bias acting on it tends to reverse. Inasmuch as all of the fluid discharged from motor 14 to conduit portion 17b is delivered to the pump through the parallel paths defined by orifice 74 and by the by-pass path, the cam plate 18 will assume a position dictated by the instantaneous speed of motor 14. In other words, the movement of cam plate 18 will be retarded so that it now commences to move toward the zero displacement position at a rate proportional to motor deceleration. As a result, shuttle valve 104 will not shift and the cycling action characterizing the transmission without the by-pass path is avoided. It will be apparent that, in this case, the cam plate 18 will not be in the zero displacement position when orifice 74 reaches closed position, but, since the pump inlet always receives fluid through the by-pass path, no cavitation will occur.

It might be mentioned that since the preferred transmission affords no dynamic braking as the operator closes orifice 74, the rate of deceleration of drum 15 depends upon the friction inherent in the drum drive mechanism and is relatively low. If an overrun condition such as this cannot be tolerated, an auxiliary brake may be provided. Of course, when the operator decreases the speed of drum 15 by manipulating servo valve 34, dynamic braking is afforded and no other brake is required.

As stated previously, the drawings and description relate only to the preferred embodiment of the invention. Since many changes can be made in the structure of this embodiment without departing from the inventive concept, the following claims should provide the sole measure of the scope of the invention.

What is claimed is:
1. A hydrostatic transmission comprising
(a) a pair of hydraulic units at least one of which is of the variable displacement type and includes a displacement control element, one unit being a pump and the other unit being a motor;
(b) conduit means connecting the two units in a closed circuit;
(c) a manually operated actuator;
(d) a fluid pressure position-responsive servo control connecting the actuator with the displacement control element for positioning the latter in accordance with the position of the former, the servo control having a supply passage from which it derives the motive fluid for positioning the displacement control element;
(e) a source of control pressure;
(f) valve means connected with the source and the supply passage and shiftable between a first position in which the supply passage is connected with the source and a second position in which the supply passage is disconnected from the source; and
(g) means responsive to the speed of the motor for positioning the valve means in said first and second positions, respectively, when motor speed is below and above a predetermined value.

2. A hydrostatic transmission comprising
(a) a hydraulic motor and a variable displacement hydraulic pump having a displacement control element;
(b) conduit means connecting the pump and motor in a closed transmission circuit;
(c) a manually operated actuator;
(d) a reservoir;
(e) a fluid pressure servo control of the position-responsive type connecting the actuator with the displacement control element for positioning the latter in accordance with the position of the former, the servo control having a supply passage from which it derives the motive fluid for positioning the displacement control element;
(f) a source of control pressure;
(g) a speed control valve connected with the source and the supply passage and shiftable between a first position in which the supply passage is connected with the source and a second position in which the supply passage is connected with the reservoir, the speed control valve having an intermediate position in which the supply passage is isolated from both the source and the reservoir; and
(h) means responsive to the rate of flow through the transmission circuit for shifting the speed control valve to the first and second positions, respectively, when the rate of flow is below and above a predetermined value and for positioning the valve means in said intermediate position when the rate of flow is approximately equal to said predetermined value.

3. A hydrostatic transmission as defined in claim 2
(a) in which the pump and motor are reversible and the displacement control element is movable between maximum displacement positions on opposite sides of a zero displacement position;
(b) in which the servo control comprises:
 (1) a double-acting fluid pressure motor having a movable element connected with the displacement control element and a pair of opposed working chambers,
 (2) a servo valve including two relatively movable members having a null position in which each working chamber is connected with the supply passage and the reservoir, a second position in which one working chamber is connected with the supply passage and the other working chamber is connected with the reservoir, and a third position in which the connections between the working chambers and the supply passage and reservoir are reversed, (3) means connecting one of the members of the servo valve with the actuator, (4) follow-up linkage connecting the other member of the servo valve with the displacement control element, and (5) means biasing the displacement control element toward the zero displacement position; and (c) which includes override means responsive to the direction of flow through the transmission circuit for permitting the flow rate responsive means to position the speed control valve when flow is in one direction and for causing the flow rate responsive means to maintain the speed control valve in its first position when flow is in the opposite direction.

4. A hydrostatic transmission as defined in claim 2

(a) in which the means responsive to the rate of flow through the transmission circuit comprises:

(1) an adjustable metering orifice located in the circuit, (2) means biasing the speed control valve toward the first position, and (3) means responsive to the pressure differential across the metering orifice for shifting the speed control valve toward the second position; and (b) which includes:

(1) a by-pass conduit connected with the transmission circuit at points upstream and downstream, respectively, of the metering orifice, and (2) a relief valve located in the by-pass conduit and arranged to permit flow from the upstream to the downstream side of the metering orifice through the by-pass conduit upon the occurrence of a predetermined pressure differential across the orifice.

5. A hydrostatic transmission comprising (a) a hydraulic motor;

(b) a hydraulic pump of the variable displacement type having a displacement control element movable between maximum displacement positions on opposite sides of a zero displacement position and which element is biased to the zero displacement position;

(c) first and second conduits defining with the pump and motor a closed transmission circuit;

(d) a reservoir;

(e) a charge pump having an inlet connected with the reservoir and an outlet;

(f) a third conduit connecting the outlet of the charge pump with the first conduit;

(g) a check valve located in the third conduit and arranged to prevent reverse flow from the first conduit to the charge pump;

(h) a double-acting motor having a pair of opposed working chambers and a piston connected with the displacement control element;

(i) a servo valve having a supply passage and two relatively movable valve members, the members having a null position in which each working chamber is connected with the supply passage and the reservoir, a second position in which one working chamber is connected with the supply passage and the other working chamber is connected with the reservoir, and a third position in which the connections between the working chambers and the supply passage and the reservoir are reversed;

(j) a manual actuator connected with one of the members of the servo valve for moving it in opposite directions from the null position;

(k) follow-up linkage connecting the displacement control element with the other member of the servo valve for returning the members to null position;

(l) a speed control valve connected with the supply passage, the charge pump and the reservoir and shiftable between first and second positions in which, respectively, the supply passage is connected with the charge pump and the reservoir, and having an intermediate position in which the supply passage is isolated from both the charge pump and the reservoir;

(m) spring means biasing the speed control valve toward the first position;

(n) a double-acting valve motor having opposed working chambers and a piston connected with the speed control valve for moving it toward the second position against the bias of the spring means;

(o) a fourth conduit connected with the outlet of the charge pump;

(p) a metering orifice;

(q) a carrier for the metering orifice movable between a first position in which the orifice is in the second conduit and second position in which the orifice is removed from the second conduit;

(r) valve means operated by the carrier and arranged to connect the fourth conduit with the second conduit at a point between the orifice and the motor when the carrier is in the first position and to interrupt this connection when the carrier is in the second position;

(s) means responsive to the pressure in the fourth conduit and urging the carrier toward the first position;

(t) means responsive to the pressure in the second conduit between the orifice and the pump when the carrier is in the first position for urging the carrier toward the second position; and (u) conduit means connecting the opposed working chambers of the valve motor with the second conduit on opposite sides of the place where the orifice is inserted in this conduit.

6. A hydrostatic transmission comprising (a) a hydraulic motor;

(b) a hydraulic pump of the variable displacement type having a displacement control element movable between maximum displacement positions on opposite sides of a zero displacement position and which element is biased to the zero displacement position;

(c) first and second conduits connecting the pump and motor in a closed transmission circuit;

(d) a reservoir;

(e) a charge pump having an inlet connected with the reservoir and an outlet;

(f) a third conduit connecting the outlet of the charge pump with the first conduit and containing a check valve arranged to prevent flow toward the charge pump;

(g) an actuator;

(h) a fluid pressure servo control of the position-responsive type connecting the actuator with the displacement control element for positioning the latter in accordance with the position of the former, the servo control having a supply passage from which it derives the motive fluid for positioning the displacement control element;

(i) a speed control valve connected with the supply passage, the charge pump and the reservoir and shiftable between first and second positions in which, respectively, the supply passage is connected with the charge pump and the reservoir, and having an intermediate position in which the supply passage is isolated from both the charge pump and the reservoir;

(j) spring means biasing the speed control valve toward the first position;

(k) a double-acting valve motor having opposed working chambers and a piston connected with the speed control valve for moving it toward the second position against the bias of the spring means;

(l) a fourth conduit connected with the outlet of the charge pump;

(m) a metering orifice;

(n) a carrier for the metering orifice movable between a first position in which the orifice is in the second conduit and second position in which the orifice is removed from the second conduit;

(o) valve means operated by the carrier and arranged to connect the fourth conduit with the second conduit at a point between the orifice and the motor when the carrier is in the first position and to interrupt this connection when the carrier is in the second position;

(p) means responsive to the pressure in the fourth conduit and urging the carrier toward the first position;

(q) means responsive to the pressure in the second conduit between the orifice and the pump when the carrier is in the first position for urging the carrier toward the second position;

(r) conduit means connecting the opposed working chambers of the valve motor with the second conduit on opposite sides of the place where the orifice is inserted in this conduit;

(s) high and low pressure relief valves, the high pressure relief valve having an outlet connected with the inlet of the low pressure relief valve and the low pressure relief valve having an outlet connected with the reservoir;

(t) shuttle valve means responsive to the pressure differential between the second conduit at a point on the motor side of the metering orifice and the first conduit for connecting the higher pressure conduit with the high pressure relief valve and for connecting the lower pressure conduit with the low pressure relief valve;

(u) a by-pass conduit connected with the second conduit at opposite sides of the metering orifice; and (v) a third relief valve located in the by-pass conduit and ararnged to permit flow from the motor to the pump when the pressure differential across the orifice exceeds a predetermined value less than the cracking pressure of the low pressure relief valve.

7. A fluid control device comprising
(a) a housing containing first, second and third passages;
(b) a fourth passage connecting the first and second passages;
(c) a fifth passage connecting the first and third passages;
(d) a metering orifice;
(e) a carrier for the metering orifice movable between a first position in which the orifice is interposed in the fourth passage and a second position in which the orifice is removed from the fourth passage;
(f) valve means operable by the carrier for closing the fifth passage when the carrier is in the second position and for opening the fifth passage when the carrier is in the first position;
(g) means responsive to the pressure differential between the first and second passages when the carrier is in the first position for holding the carrier in said first position when the pressure in the first passage is higher than the pressure in the second passage and for shifting the carrier to the second position when the pressure in the second passage is higher than the pressure in the first passage; and (h) second means responsive to the pressure differential between the third and fourth passages when the carrier is in the second position for holding the carrier in the second position when the pressure in the fourth passage is higher than the pressure in the third passage and for shifting the carrier to the first position when the pressure in the third pasage is higher than the pressure in the fourth passage.

8. The fluid control device defined in claim 5 in which the carrier can move along a second path of motion different from a first path between said first and second positions; and in which the restriction afforded by the metering orifice is varied as the carrier is moved along said second path of motion.

9. A fluid control device comprising
(a) a housing containing a bore;
(b) first and second passages intersecting the bore at diametrically opposed positions;
(c) a third passage communicating with the bore at a point spaced longitudinally from the intersections of the first and second passages;
(d) a fourth passage connected at one end with the first passage and intersecting the bore at a point between the first and second passages and the third passage;
(e) a plug slidable in the bore between first and second positions;
(f) a flow passage extending through the plug in the transverse direction and arranged to interconnect the first and second passages when the plug is in said first position, the flow passage being provided with a port at the end adjacent the first passage whose width varies in the circumferential direction;
(g) a rotary actuator;
(h) means connecting the actuator with the plug so that the plug may be rotated by the actuator without being restrained against longitudinal movement in the bore;
(i) opposed reaction surfaces carried by the ends of the plug, one surface being subject to the pressure in the third passage when the plug is in both of said positions and arranged to urge the plug toward the first position, and the other surface being isolated from and in communication with the first passage when the plug is in siad first and second positions, respectively;
(j) a second flow passage for transmitting the pressure in the second passage to the said other reaction surface when the plug is in said first position; and
(k) valve means carried by the plug and the housing for opening and closing communication between the third and fourth passages through the bore when the plug is in said first and second positions, respectively.

10. A hydrostatic transmission as defined in claim 5 including a check valve located in the fourth conduit and arranged to prevent flow toward the charge pump.

No references cited.